(12) United States Patent
Patil et al.

(10) Patent No.: US 10,144,204 B2
(45) Date of Patent: Dec. 4, 2018

(54) SUBSTRATE HAVING PROPERTIES OF MAMMALIAN SKIN

(75) Inventors: Pankaj Yadav Patil, Cincinnati, OH (US); Richard Tweddell, III, Hamilton, OH (US); Saswati Datta, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 2721 days.

(21) Appl. No.: 11/650,919

(22) Filed: Jan. 8, 2007

(65) Prior Publication Data

US 2008/0167398 A1 Jul. 10, 2008

(51) Int. Cl.
   B32B 7/02 (2006.01)
   B32B 27/08 (2006.01)
   B32B 27/40 (2006.01)
   G09B 23/30 (2006.01)

(52) U.S. Cl.
   CPC .............. *B32B 27/40* (2013.01); *B32B 7/02* (2013.01); *B32B 27/08* (2013.01); *G09B 23/30* (2013.01); *Y10T 428/24512* (2015.01); *Y10T 436/10* (2015.01)

(58) Field of Classification Search
   None
   See application file for complete search history.

(56) References Cited

U.S. PATENT DOCUMENTS

| | | | |
|---|---|---|---|
| 4,066,269 A * | 1/1978 | Linne | 277/575 |
| 4,346,205 A | 8/1982 | Hiles | |
| 4,481,001 A * | 11/1984 | Graham et al. | 434/267 |
| 4,596,528 A * | 6/1986 | Lewis et al. | 434/270 |
| 5,015,431 A * | 5/1991 | Charkoudian | 264/222 |
| 5,252,373 A | 10/1993 | Ganske et al. | |
| 5,642,860 A | 7/1997 | Bush et al. | |
| 5,962,127 A | 10/1999 | Maxon | |
| 6,093,468 A * | 7/2000 | Toms | A41D 13/0158 2/22 |
| 6,558,422 B1 | 5/2003 | Baker et al. | |
| 2007/0128255 A1 | 6/2007 | Belcher et al. | |

FOREIGN PATENT DOCUMENTS

JP 11009339 A * 1/1999

OTHER PUBLICATIONS

Machine translation of JP 11-09339 A, original document published Jan. 1999.*
Gennisson et al; IEEE Transactions on Ultrasonics, Ferroelectrics and Frequnecy Control 51(8), p. 980-989, Aug. 2004.*
Shore scale comparison chart from www.rexgauge.com, accessed Feb. 25, 2011, copyright 2006.*
Behl et al., Chapter 1 of Methods of Skin Absorption Eds. Kemppainen and Reifenrath, , p. 1-21, CRC press, 1990.*
Kenet, "How to Wash Your Face" p. 42, 1999.*
Skin Flex III Material Application and Handling Guide from www.bjbenterprises.com, May 31, 2000.*
Fowkes, F. M., "Attractive Forces at Interfaces," The Interface Symposium—5, Industrial and Engineering Chemistry, vol. 56, No. 12, p. 40 (1964).

* cited by examiner

*Primary Examiner* — Nissa M Westerberg
(74) *Attorney, Agent, or Firm* — John G. Powell

(57) ABSTRACT

Substrate comprising a discrete first layer comprising a first surface, an opposing second surface and a polymeric first material, wherein the first layer has a thickness of from about 1 micron to about 1000 microns and a hardness of from about 10 to about 80 on the Shore A scale; a discrete second layer comprising a first surface, an opposing second surface, and a second material, wherein the second layer has a hardness of from about 1 to about 70 on the Shore OOO scale and a thickness of from about 0.001 cm to about 2.0 cm; a discrete third layer comprising a first surface and a third material, wherein the third layer has a hardness of from about 0 to about 90 on the Shore D scale; and wherein the second surface of the first layer is in substantially fixed and continuous contact with the first surface of the second layer; the second surface of the second layer is in substantially fixed and continuous contact with the first surface of the third layer; and wherein the ratio of the average thickness of the second layer to the average thickness of the third layer is from about 4:96 to about 25:75.

15 Claims, 2 Drawing Sheets a)

SUBSTRATE HAVING PROPERTIES OF MAMMALIAN SKIN

FIELD OF THE INVENTION

The present invention relates to an article of manufacture comprising a first substrate and a second substrate, useful as a model of mammalian skin.

BACKGROUND OF THE INVENTION

Many consumer products are applied to the skin or hair, and/or involve the sensory experience of touching. Consumer preferences are influenced by a multitude of factors, including product effectiveness, the feel of the product, fragrance, durability, ease of rinsing, etc. One way to determine consumer preferences is by conducting consumer marketing tests, in which a representative group of consumers, or panelists, provide feedback after using a product. Consumer marketing tests have several drawbacks, however. Because panelists must be appropriately selected and compensated for their time, such tests are expensive and time consuming. Human feedback is inherently subjective, and may raise concerns about reliability. Products must be safe for human testing, and the analyses that can be performed after application also are limited.

Some product testing can be performed using model systems. Artificial substrates are available that, to some extent, imitate human skin. For example, theatrical performers often transform their appearance by using molded body parts that can be made to look remarkably like human skin. Alternatively, keratinous tissue from animals or human cadavers may be used. Whereas these and other available models may be suitable for some types of product testing, all have significant limitations. Cadaver tissue is costly, and neither cadaver nor animal tissue can truly mimic living, human tissue. Previously available artificial substrates provide poor models to assess characteristics such as product adsorption, rinseability, and the look and feel of a product upon application.

In a previous application, applicants addressed some shortcomings of available models by applying to a suitable substrate one or more coating materials which allow variation of surface energy, surface charge and surface reactivity. In this manner, a surface can be created which mimics various types of keratinous tissue, for example, wet, dry, young, aged skin etc. on various parts of the body. A challenge remained, however, to create a model which, in addition to the aforementioned properties, mimics the elasticity, compressibility and appearance of skin. For example, when skin is stroked or rubbed, a given amount of stretching and movement of the skin occurs. When pressure is applied to skin, some compression occurs. If the skin has sufficient elasticity, it may resume its original form when the rubbing and/or pressure are ceased. Furthermore, the natural appearance of skin, including tone and pigmentation, is due in part to its various layers. For example, the outermost layer of skin, the stratum corneum, typically is more transparent than the underlying dermal layer, which contains skin pigments. The interactions of light with the various layers, such as refraction and/or reflection of pigmentation by the stratum corneum, along with localized differences in coloration, result in the skin's natural appearance.

In addition, skin elasticity, compressibility, appearance and other characteristics change over time and may vary widely, depending upon factors such as the type of skin, the time of day, amount of sleep, the location on the body, age, environmental conditions, diet, gender, and disease, to name a few. For example, skin elasticity tends to decrease with age. Compressibility may increase with disease states such as edema or with an increase in underlying fatty tissue. Currently available models fail to adequately mimic skin compressibility and elasticity, may exhibit undesirable characteristics such as "bleeding" (a leaking of underlying material to the surface) or stickiness, and furthermore tend to have a uniform color and mask-like appearance. There exists a need, therefore, to provide an artificial substrate that more accurately mimics the elasticity, compressibility, appearance and other relevant physical properties of a variety of skin types.

SUMMARY OF THE INVENTION

The present invention meets the aforementioned needs. Applicants have developed an artificial substrate that mimics mammalian skin, comprising a first layer, a second layer and a third layer. The first layer has a thickness of from about 1 micron to about 1000 microns and a hardness of from about 10 to about 80 on the Shore A scale. The hardness of the second layer is from about 1 to about 70 on the Shore OOO scale, and the hardness of the third layer is from about 0 to about 90 on the Shore D scale. The ratio of the thickness of the second layer to the thickness of the third layer is from about 4:96 to about 25:75.

When the first, second and third layers are comprised of a suitable material and have a suitable thickness, as described herein, the resulting substrate has compressibility, elasticity and feel similar to mammalian skin. By varying the material and/or thickness of the individual layers, the compressibility and elasticity can be varied to more closely mimic different types of skin, such as young, aged, skin on various parts of the body, etc.

The first layer may comprise a coating material to allow controlled variation of physical properties representative of mammalian skin such as surface energy, charge and reactivity. For example, by varying the surface energy, the substrate can be made to more closely mimic skin hydrophobicity and hydrophilicity. Therefore, if one is interested in formulating a product that more effectively adheres to skin in the shower, a coating material similar in hydrophilicity to wet skin can be applied to the surface of the substrate, the product applied to the substrate, and the substrate subsequently rinsed and analyzed.

The first layer and/or coating material may be textured to mimic mammalian skin of interest. Texture may be important in determining, for example, product deposition and coverage, including on areas of skin having wrinkles, deep lines and/or a rough texture. Texture also may be important in determining whether a given product is effective, for example, in dark, moist environments produced by deep lines and folds of skin.

The substrate may have a variety of uses, one example of which is as a product development aid. A test-substance, for example, a consumer product, can be topically applied to the substrate, which in turn can be analyzed by a various methods. The information gained from the analyses can be used to tailor the product to consumer preferences. Thus, the substrate described herein may aid in more rapid, efficient and cost-effective product development. Other non-limiting examples of uses of the substrate of the present invention include use as a training aid, for example to aid in the instruction of medical procedures involving skin such as injections, incisions, bandaging, etc; as a training aid for cosmetologists, make-up artists, and other professions involving interaction with skin; and for essentially any use in which a more accurate model of mammalian skin would be beneficial.

For product development purposes, use of the substrate offers several advantages over both consumer marketing tests and currently available models. The substrate is cost effective, easy to produce, store and use, is robust, can be effectively cleaned with a variety of solvents without substantial deterioration, and re-used. Testing can be performed more rapidly, and can more easily be repeated, resulting in increased throughput, efficiency and reproducibility. After a test-substance has been applied, the substrate can be analyzed using standard physical and analytical methods, which results in more objective and reliable data than can be obtained from human panelists. A wide variety of analyses can be performed, including destructive analyses, which are not possible to perform on human subjects. In addition, the physical properties can be selected that are beyond the parameters typically observed in human skin, which would, for example, allow mechanistic studies to be performed.

In addition, modeling elasticity and compressibility provides advantages that include, but are not limited to, being able to more accurately assess the feel of a product, for example a lotion or cosmetic, upon application; how products perform over time and with movement; how facial moisturizers and cosmetics wear with repeated facial movements such as smiling and talking; how lipstick adheres to various areas of the lips during the course of the day; how movements such as bending and flexing affect the adhesion of patches and bandages; how much force is required for adhesive removal, and the effectiveness of this force is as skin elasticity is varied.

The following represent non-limiting embodiments of the present invention.

According to a first embodiment of the present invention, a substrate is provided, comprising a discrete first layer comprising a first surface, an opposing second surface and a polymeric first material, wherein the first layer has a thickness of from about 1 micron to about 1000 microns and a hardness of from about 10 to about 80 on the Shore A scale; a discrete second layer comprising a first surface, an opposing second surface, and a second material, wherein the second layer has a hardness of from about 1 to about 70 on the Shore OOO scale and a thickness of from about 0.001 cm to about 2.0 cm; a discrete third layer comprising a first surface and a third material, wherein the third layer has a hardness of from about 0 to about 90 on the Shore D scale; and wherein the second surface of the first layer is in substantially fixed and continuous contact with the first surface of the second layer; the second surface of the second layer is in substantially fixed and continuous contact with the first surface of the third layer; and wherein the ratio of the average thickness of the second layer to the average thickness of the third layer is from about 4:96 to about 25:75.

According to another embodiment of the present invention, a method of modeling the interaction of at least one substance with mammalian skin is provided, comprising the step of applying the substance to a substrate according to the first embodiment.

According to yet another embodiment of the present invention, a method of product evaluation is provided, comprising the steps of providing a substrate according to the first embodiment, providing a second substrate; contacting at least one of the substrates to an instrument capable of measuring frictional force; bringing the first substrate into contact with the second substrate; moving the first substrate with respect to the second substrate in a controlled manner while maintaining substantially continuous contact between the first substrate and the second substrate; and measuring the frictional force generated by the movement of the first substrate relative to the second substrate.

According to another embodiment of the present invention, a method of product development is provided, comprising the step of applying at least one substance to a substrate according to the first embodiment, generating at least one set of data, and comparing the data to a second set of data.

Yet another embodiment of the present invention, a method is provided of simulating interactions with mammalian keratinous tissue, comprising the steps of providing a substrate according to the first embodiment and performing an act on the substrate as may be performed on mammalian keratinous tissue.

According to another embodiment of the present invention, an article of commerce is provided, comprising a substrate according to the first embodiment and instructions for using said article of manufacture to model mammalian skin.

According to another embodiment of the present invention, a process for making a substrate according to the first embodiment, wherein at least one coating material is stably affixed to the surface of the first layer.

DETAILED DESCRIPTION OF THE INVENTION

The present invention describes a substrate which has physical properties similar to mammalian skin, including but not limited to, surface charge, surface energy, surface reactivity, texture, appearance, compressibility and elasticity. The substrate is useful as a model skin, or skin mimic, and may be customized to simulate a variety of skin types in a variety of environments.

In all embodiments of the present invention, all percentages are by weight of the substrate, unless specifically stated otherwise. All ratios are weight ratios, unless specifically stated otherwise. The number of significant digits conveys neither limitations on the indicated amounts nor on the accuracy of the measurements. All ranges are inclusive and combinable. All amounts indicating quantities, percentages, proportions, physical parameters, etc. are understood to be modified by the word "about" unless otherwise specifically indicated.

"Skin," as used herein, means keratin-containing layers disposed as the outer layer of mammalian epidermal tissue, including skin on any part of the body, lips, mouth and oral cavity, and vulvar region. The vulvar region is understood to include the region from the posterior gluteal groove and perineum to the anterior mons pubis and laterally between the intertriginous zones. The skin may be vary widely in characteristics that include, but are not limited to, age, condition (for example, dryness, roughness), thickness, elasticity, pigmentation, presence of blemishes and/or imperfections, etc. "Skin" also is understood to include the outer layer of mammalian mucosal membranes, such as the alimentary canal, including the oral cavity, nasal cavity, lips, and the vaginal canal.

"Texture," as used herein, means a series of impressions and/or elevated areas, relative to the average height of the planar surface of the textured layer.

"Resembles," "mimics," or alternatively "simulates," when used in conjunction with texture, means that one of ordinary skill in the art would recognize the depth, density and arrangements of the lines and/or grooves of the article of manufacture to be similarly patterned to the skin of interest.

"Physical properties representative of mammalian skin," or grammatical equivalents thereof, as used herein, means physical and/or chemical properties of the article of manufacture that are substantially similar to mammalian skin and that may be relevant to a particular product or substance. For example, if the skin is found to be hydrophobic and positively charged, the coated surface of the article of manufacture also will be hydrophobic and positively charged.

"Homogeneously mixed," as used herein, means that materials are combined such that the chemical and physical properties of various areas of the coating material are substantially uniform.

"Discrete," as used herein, means areas which have boundaries distinguishable on the basis of physical and/or chemical properties. Discrete is understood to mean layers assembled as described herein, as opposed to, for example, co-extruded layers.

"Continuous," as used herein in reference to layers, means one or more layers which do not have discrete boundaries, but which form a continuum of physical and/or chemical characteristics. One non-limiting example of a continuous layer is one which is substantially formed of a single composition, but which may have a physical property, for example hardness, which changes gradually throughout the layer, such that the top of the layer may be softer than the bottom of the layer.

"Stably affixed," or alternatively "bonded," as used herein, means that a compound, for example a coating layer, is stably attached such that the compound remains substantially affixed during at least one use and analysis. "Substantially affixed" is understood to mean any amount of coating layer that may be incidentally removed is insufficient to measurably alter the physical properties of the artificial substrate surface that are representative of keratinous tissue. "Stably affixed" further means that the compound remains substantially affixed when rinsed and/or rubbed with solvents including, but not limited to, water, detergents, alcohols (for example, methanol, ethanol and isopropanol), hydrocarbons (for example, hexane). The bonding may be covalent, or may occur by any suitable means as would be understood by one of skill in the art to result in being stably affixed as defined herein. "Stably affixed" is understood not to include, for example, laminated or other coating layers which may be removed, exhibit peeling, and/or are visibly or otherwise damaged upon exposure to solvents including, but not limited to, the aforementioned solvents.

"Stable," as used herein, means that the chemical and/or physical properties of the article of manufacture do not change significantly under reasonable conditions of use, including cleaning, transport and storage conditions. When used in reference to one or more coating materials, "stable" means that significant amounts of the coating material are not removed during use, non-destructive types of analysis, and/or cleaning.

"Substantially continuous contact," as used herein, means that the layers are in sufficient contact to prevent significant shifting of the relative positions of the layers, and to prevent the occurrence of pockets of air or other substances that would significantly affect the substrate properties.

"Re-used," as used herein, means that a substance may be applied to the substrate and data reliably obtained at least twice.

"Interaction of products with mammalian skin," includes, but is not limited to, absorption, adsorption, covalent bonding, dispersion, changes in physical properties such as color, opacity, odor, texture, feel, etc.

"Act," as used herein in phrases such as "an act as may be performed on mammalian keratinous tissue," includes acts that one may desire to practice prior to performing on living mammalian skin, for example, applying substances such as make-up or medications, administering injections, performing incisions, massaging, applying pressure, bandaging, stitching, etc.

I. Substrate

A. General Structure

In one embodiment, the substrate of the present invention may comprise a first layer, a second layer, and a third layer. The substrate may take a variety of shapes and forms. In one embodiment, the substrate is in the form of discrete, substantially planar layers in substantially fixed and continuous contact with each other (i.e., "sandwich style"). The first and second layers may have a first surface and an opposing second surface. The third layer comprises at least a first surface, and may additionally comprise an opposing second surface. Thus in one embodiment, the substrate comprises a first discrete layer, a second discrete layer, and a third discrete layer, wherein first surface of the third layer may be in substantially continuous contact with the second surface of the second layer, and the opposing first surface of the second layer may be in substantially continuous contact with the second surface of the first layer. The first surface of the first layer and the second surface of the third layer may be exposed to the outside environment. In one embodiment, one or more coating materials may be stably affixed to the first surface of the first layer. In one embodiment, the first layer may extend around the entire substrate, so as to fully enclose the substrate and thus form a protective sheath or "jacket." Thus the first surface of the first layer would be exposed to the environment, and the second surface of the first layer would be in contact with the various substrate layers as well as the second surface of the third layer. In another embodiment, the substrate may be in the form of a human body part, non-limiting examples of which include a head, face, arm, leg, hand, foot, finger, toe, upper torso, lower torso, buttocks, external genitalia and/or pelvic region. Alternatively, the substrate may be in the form of human, and alternatively of a child's, buttocks and/or pelvic region. In another embodiment, the substrate may be substantially cylindrical, and have an average diameter of from about 0.1 cm to about 3.0 cm.

The proper thickness of the layers, in particular of the second and third layers is necessary to mimic skin elasticity. In one embodiment, the ratio of the thickness of the second layer to the thickness of the third layer is from about 4:96 to about 25:75, alternatively from about 4:96 to about 15:85, and alternatively from about 4:96 to about 10:90. In one embodiment, the sum of the thickness of the second layer and the thickness of the third layer is from about 1 mm to about 2 cm, alternatively is about 0.5 cm to about 2 cm, and alternatively is about 1 cm.

The layers may be colored, white or colorless, and may be transparent or opaque. In one embodiment, one or more layers are similar in color to a desired type of mammalian skin. Alternatively, one or more layers are similar in color to human skin. Alternatively, the color may be altered to resemble various degrees and types of pigmentation found in human skin. In one embodiment, second layer comprises a material, such as a pigment, particulate, dye or the like, suitable to create an appearance similar to various types of pigmented skin.

Figure 1:
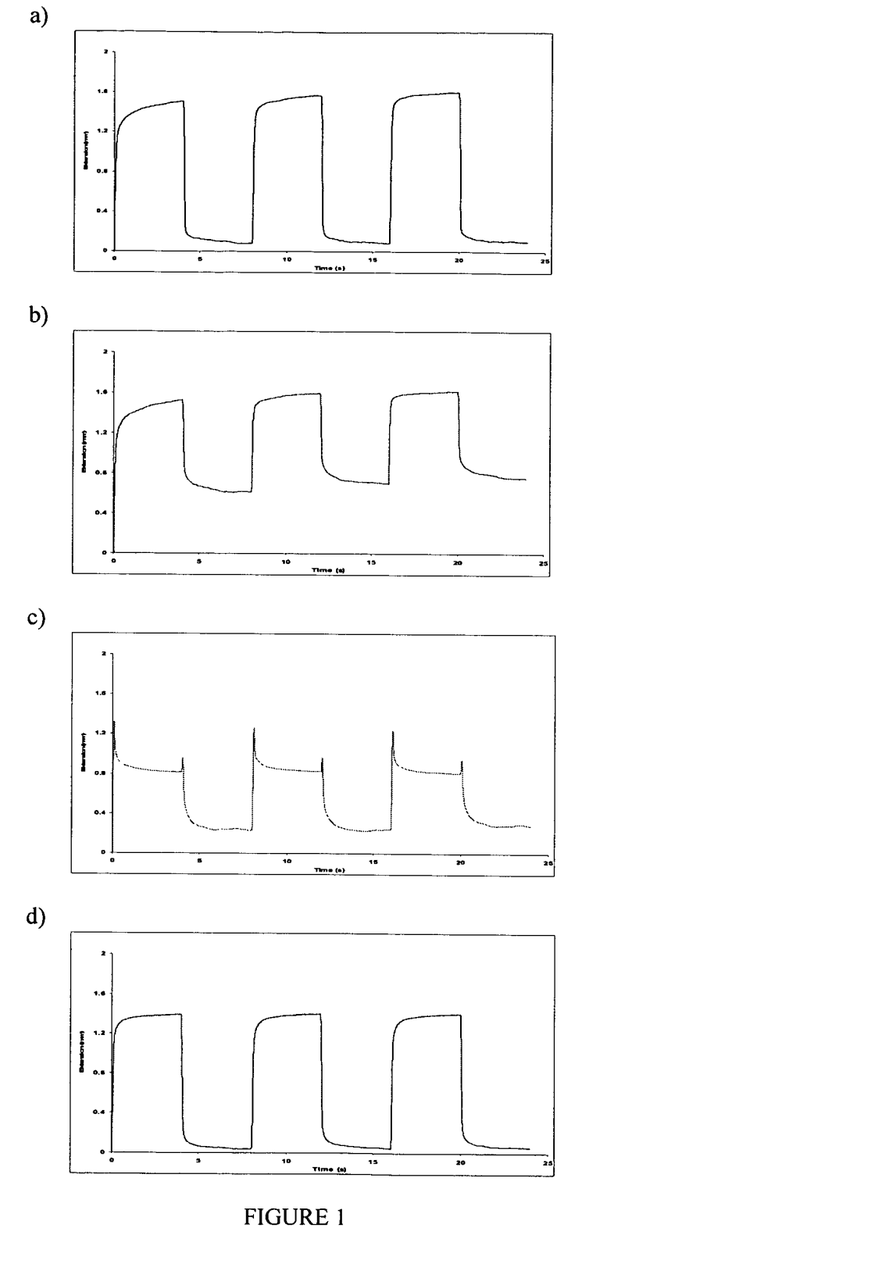
FIG. 1, depicts graphs a-d of the elongation in millimeters (y-axis) of human skin and of substrates vs. time in seconds (x-axis), as measured by a cutometer according to a method described herein.
Figure 2:
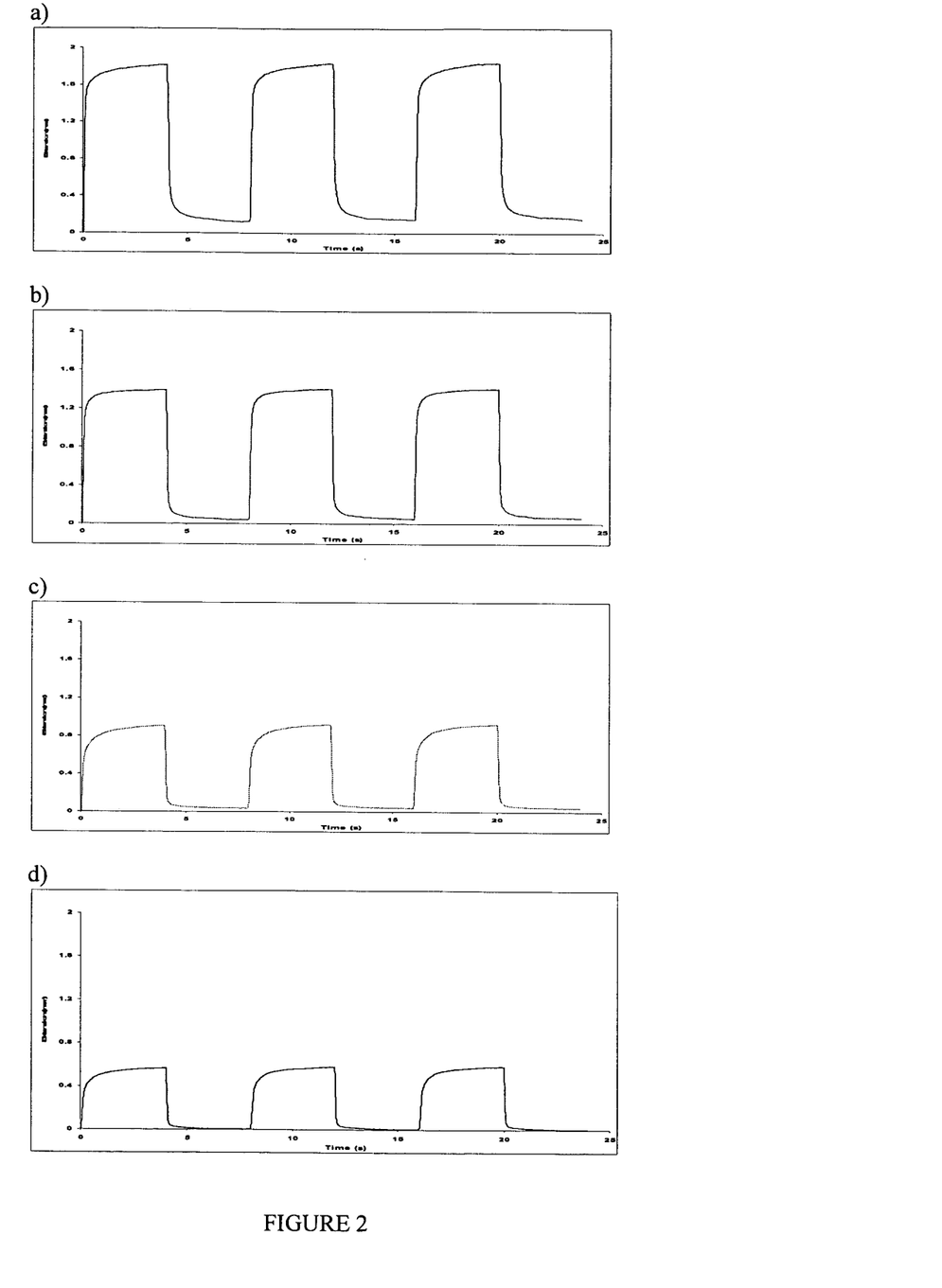
FIG. 2 depicts graphs of the elongation in millimeters (y-axis) of various substrates of the present invention vs. time in seconds (x-axis), as measured by a cutometer according to a method described herein.

The elasticity of the substrate of the present invention may be similar to that of human skin. FIG. 1 depicts graphs comparing the elasticity of a substrate of the present invention to human skin and to a comparative example. Graph (a) represents measurements made on the surface of a forearm of a 25 year-old male, and is indicative of the elasticity of youthful, healthy skin. Graph (b) represents the elasticity of more aged skin, made on the surface of the forearm of a 55 year-old male. Graph (c) represents measurements made on a substrate as described in Example 1, sample 2, which falls outside of the range of the present invention, as evidenced by the decreasing elasticity between approximately 1 and 5 seconds, approximately 8 through 12 seconds, and approximately 17 through 20 seconds. Graph (d) represents measurements made on a substrate as described herein, and made as described in Example 1, sample 5. FIG. 2 depicts elasticity measurements made on various substrates described herein. The substrate yielding graph (a) was made according to example 1, sample 5; graph (b) according to example 1, sample 7; graph (c) according to example 1, sample 8; and graph (d) according to example 1, sample 9.

Elasticity measurements may be made with an SEM 575 Cutometer (Courage & Khazaka, Köln, Germany), having a main unit and a hand-held probe. Use of a cutometer for skin elasticity measurements is described by Nishimori et al. in *J. of Investigative Dermatology* Vol. 117, No. 6 (2001). The hand-held probe comprises a circular opening having a diameter of approximately 2 mm, which is held to the surface of the skin while applying substantially constant pressure so as to create suction. The suction results in a slight stretching, or distension, of the tissue surface. Referring again to FIG. 2, the x-axis represents the height of the stretched tissue in millimeters; the y-axis represents the time during which suction is applied at a pressure of about 400 mbar for about 4 seconds, followed by a relaxation period of about 4 seconds, during which no pressure is applied while the probe continues to be held onto the surface of the tissue. "Ue" represents immediate elasticity, measured immediately after application of suction, and corresponds to the steep linear section of the curve; "Uv" represents delayed distension of the skin, and is considered indicative of skin viscosity; "Ur" represents immediate elastic recovery of the skin after removal or the suction, or retraction; and "Uf" represents the final, or maximum, deformation, defined as "Ue+Uv." The ratio Ur:Ue represents skin firmness, with a higher ratio indicating increased firmness. The ratio Ur:Uf represents skin elasticity, with a higher ratio representing increased elasticity.

The substrate of the present invention has an elasticity of from about 0.3 to about 1.0, and alternatively from about 0.3 to about 0.9, as measured with an 8 mm probe. In one embodiment, the substrate mimics aged skin, and may have an elasticity of from about 0.3 to about 0.5. In another embodiment, the substrate mimics young adult skin, and may have an elasticity of from about 0.5 to about 0.7. In another embodiment, the substrate mimics baby skin, and may have an elasticity of from about 0.7 to about 0.9.

The substrate and/or layers of the substrate have a hardness suitable to mimic a given type of mammalian skin. For example, a substrate which mimics skin covering underlying bone will have a hardness greater than that of a substrate which mimics skin covering underlying soft tissue. In one embodiment, the substrate has a hardness of from about 25 to about 100, alternatively from about 25 to about 75, and alternatively from about 40 to about 60, on the Shore OOO scale. Hardness may be described on one of several scales, for example, the Shore A, D, OO and OOO scales. Hardness may be measured using a Rex-Gauge™ Durometer (Rex-Gauge, Inc., Buffalo Grove, Ill.), according to ASTM Hardness Test Method D2240-05. One example of a suitable method of measuring hardness includes the following steps. If measurements are made on human tissue, clean the durometer probe between measurements. Using a Rex-Gauge™ OOO-type durometer, place the probe on the desired surface, for example on human skin, on a substrate and/or on a substrate layer material described herein. Ensure that the probe is vertical to the surface, is resting with its full weight on the surface but has no additional pressure applied. Hold in a stable position for about 10 seconds. Multiple readings per site may be obtained and the readings averaged.

The substrate of the present invention may have a coefficient of friction similar to mammalian skin. The coefficient of friction provides an indication of the feel of the skin, for example when stroked. In one embodiment, the coefficient of friction of the substrate of the present invention is from about 0.30 to about 1.0, and alternatively from about 0.35 to about 0.70, and alternatively from about 0.35 to about 0.45. The coefficient of friction may be measured with a UMT Microtribometer UMT-2, equipped with UMT Software Version 1.62 (Center for Tribology™ Inc., Campbell, Calif.). The instrument consists of a main unit with a computer-controlled hand positioning device. The main unit contains the tracing motor unit with the sensor to adjust the height of the probe to attach the skin and to monitor the friction force transmitted from the probe head. Measurements may be made for example on human tissue, on a substrate and/or on a substrate layer material described herein. If performed on a human subject, allow the subject to rest in the room where the measurement will be taken for 20 minutes prior to measurement. Mark a test area on the subject, substrate or material to be tested, for example 4×6 cm. Place the test area on the arm holder directly under the probe. The suitable test parameters to conduct the friction measurement may include a pre-touch velocity of 4 mm/sec, touch and near velocity of 0.4 and 0.3 mm/sec. The engage force may be set at −5 gm on the surface of the sample and the constant applied force on the sample during analysis may be set at −20 gm for the measurement duration of 10 sec, where the negative value denotes a downward direction of the force. The measurements may be executed in a sequence that contains two sheets (scripts), the first sheet for touching the probe on the test site for a duration of 1 sec. the second sheet to acquire the friction measurements in the test area along the long axis of the forearm for 10 sec. This sequence may be executed 3 times to acquire 3 measurements.

A. First Layer

The substrate of the present invention comprises a discrete first layer having a first surface and an opposing second surface. The first layer may be formed by, for example, using a negative mold, into which a suitable material is poured and/or pressed. The first surface may be smooth or textured. The texture may be imprinted, etched, engraved, with or without the use of a laser and/or chemicals. The first layer further may comprise at least two materials, which may be homogeneously mixed, may form discrete areas. The first surface may demonstrate at least one physical property that is representative of mammalian skin, including, but not limited to, surface energy, surface charge and/or surface reactivity.

The first layer comprises at least one material. Non-limiting examples of suitable materials for use in the first layer, as well as for an optional sheath, are disclosed in U.S. Pat. No. 6,558,422, issued to Baker et al., and include polymers such as polypropylene, isotactic polypropylene, polyethylene, branched polyethylene, linear polyethylene, polyethylene oxide, polyethylacrylate, polyethyleneterephthalate, polyurethane, aliphatic polyurethane, polyester, polyorthoesters, polylactic acid, polyglycolic acid, polyethylene glycol, collagen, polygalactic acid, polydioxanone, polytrimethylene carbonate copolymers, poly-ε-caprolactone homopolymers and copolymers, polyanhydrides, poly-α-methylstyrene, polyamide 12, polyamide 6,6, polybutylmethacrylate, polycarbonate, fluoropolymers (including polychlorotrifluoroethylene, polytrifluoroethylene, polytetrafluoroethylene, polyvinylfluoride, polyvinylidenefluoride), polyvinylchloride, polyvinylidene chloride, polydimethylsiloxane, polyetheretherketone, polymethylmethacrylate, polyethylmeth-acrylate, polyhexylmethacrylate, polyisobutylene, polyisobutylmethacrylate, polymethacrylic acid, polymethylacrylate, polystyrene, poly(t-butylmethacrylate), polytetrahydrofurane, polytetramethylene oxide, polyvinylacetate, polyvinyltoluene, copolymers, isomers and derivatives of any of the foregoing, and mixtures thereof. In one embodiment, the first layer material is selected from the group consisting of polyurethane, polydimethylsiloxane, linear polyethylene, isostatic polypropylene, polystyrene, polyamide, and mixtures thereof. Alternatively, the first layer material is polyurethane.

The first layer may be in any shape or form suitable for the intended application. In one embodiment, the first layer is in the form of a sheet having two substantially planar surfaces, and a substantially uniform thickness. In one embodiment, the average thickness of the first layer is from about 0.001 mm to about 1 mm, alternatively from about 0.01 mm to about 0.5 mm, and alternatively from about 0.02 mm to about 0.1 mm.

B. Second Layer

The substrate of the present invention comprises a discrete second layer having a first surface and an opposing second surface. The second layer may be in any shape or form suitable for the intended application. In one embodiment, the second layer is in the form of a substantially planar sheet. The second layer may be in substantially fixed and continuous contact with a first layer and/or with a third layer. In one embodiment, the first surface of the second layer is in substantially continuous contact with the second surface of the first layer. In one embodiment, the average thickness of the second layer is from about 0.001 cm to about 2.0 cm, alternatively from about 0.01 cm to about 0.5 cm, and alternatively from about 0.03 cm to about 0.15 cm.

The substrate may comprise essentially any material that, alone or in combination with one or more additional layers, results in a substrate having the desired aforementioned properties. The second layer may have a hardness on the Shore OOO scale of from about 1 to about 70, alternatively from about 4 to about 30, and alternatively from about 8 to about 20. Non-limiting examples of suitable classes of materials include gels, including urethane gels, plastisol gels, hydrogels, silicone gels, and mixtures thereof.

Examples of hydrogels include, but are not limited to, poly(hydroxy ethyl methacrylate), poly(ethylene glycol monomethacrylate), cross-linked poly(acrylic acid), poly(acrylic acid-co-acrylamide), cross-linked poly(acrylic acid-graft-poly(ethylene oxide), poly(2-hydroxyethyl methacrylate), poly(2-hydroxypropyl methacrylate), cross-linked poly(isobutylene-co-maleic acid), etc.), superabsorbers (for example, cross-linked polyethylene oxide), salts and derivatives of the aforementioned, and mixtures thereof.

Non-limiting examples of suitable urethane gels may be found in U.S. Pat. No. 6,093,468, issued to Toms et al., and include high damping polyurethane compositions formed by the reaction of slightly branched, substantially linear polyols having hydroxyl endgroups and number average molecular weights in the range of 600 to 1200 grams per mole with an aromatic di-isocyanate in less than stoichiometric amounts. Compositions of this type are disclosed in U.S. Pat. No. 4,346,205. Similar materials can be obtained commercially under the tradename Sorbothane™ from Sorbothane, Inc. (Kent, Ohio). Also suitable for use herein are curative polyurethane gels derived from 3 component liquid material systems, for example Flabbercast™ and Skinflex III™ (BJB Enterprises, Inc., Garden Grove, Calif.). Alternatively, the curative polyurethane gels may comprise organic and/or inorganic fillers, including hollow organic and/or inorganic fillers, for example Scotchlite™ Glass Bubbles (3M Co., St. Paul, Minn.).

Suitable plastisol gels include, but are not limited to, high damping polyvinylchloride (PVC) plastisol gels, for example those prepared as dispersions of fine particle size PVC resins in plasticizing liquids. Examples of suitable plastisols include those found in U.S. Pat. No. 5,252,373, and also Plastomeric™ Plastisol M1430 Clear Base plastisol and Plastomeric™ Type B plasticizer, (Plastomeric, Inc. Waukesha, Wis.). Alternatively, the plastisol gels may comprise organic and/or inorganic fillers, including hollow organic and/or inorganic fillers, for example Scotchlite™ Glass Bubbles (3M Co., St. Paul, Minn.).

Suitable silicone gels include, but are not limited to, room temperature vulcanized silicone gels (two part, including a base and an activator), such as cross-linked polyvinyl terminated silicone gels, platinum catalyzed silicone gels, polysiloxanes including polydimethylsiloxanes, and hydroxyl-terminated tin-catalyzed ethyl silicates. Other non-limiting examples of suitable silicone gels are found in U.S. Pat. No. 5,962,127, issued to Maxson. In one embodiment, the base silicone gel comprises vinyl terminated polydimethylsiloxane, trimethyl terminated polydimethylsiloxane, and combinations thereof, and optionally comprises a platinum catalyst and/or vinyl tetramer. In one embodiment, the activator comprises trimethyl terminated polydimethylsiloxane, trimethyl terminated dimethyl methylhydrogen copolymer, and combinations thereof.

C. Third Layer

The substrate of the present invention comprises a discrete third layer. The third layer comprises at least a first surface, and may comprise an opposing second surface. The first surface of the third layer may be in substantially fixed and continuous contact with the second surface of the second layer. The third layer comprises at least one material, and may have a hardness from about 0 to about 90 Shore D, alternatively from about 40 to about 90 Shore OO, and alternatively from about 55 to about 60 on Shore OOO hardness scale. In one embodiment, the thickness of the third layer is greater than about 0.1 cm. Alternatively the thickness is from about 0.5 cm to about 1.0 cm, and alternatively from about 0.8 cm to about 1.0 cm. It is to be understood, however, that the third layer may have a thickness suitable to produce a substrate having the aforementioned suitable hardness, elasticity and coefficient of friction.

Essentially any material having a hardness within the aforementioned ranges of hardness may be suitable for use in the third layer. Examples of materials suitable for the third layer may be found in U.S. Pat. No. 5,642,860, issued to Bush et al., and include, but are not limited to, thermoplastic elastomers (TPEs), thermoset elastomers, copolymers of ethylene and octane, butene and/or hexene, ethylene/vinyl acetate (EVA) copolymers, polyurethane polymers, and/or mixtures thereof.

TPEs are defined by ASTM D1556 and may be classified into three major categories: 1) block copolymers; 2) rubber/thermoplastic blends; and 3) elastomeric alloys (EA's). Examples of block copolymers include, but are not limited to, styrenic rubber (e.g., Kraton™ from Shell Chemical), copolyester (e.g., Hytrel™ from Du Pont), polyurethane (e.g., Texin™ from Bayer), and polyamide (e.g., Pebax™ from Atochem). Rubber/thermoplastic blends, or elastomeric polyolefins, may be for example blends of ethylene-propylene-diene-monomer (EPDM) rubber and polyolefin (e.g., Vistaflex™ from Advanced Elastomer Systems, L.P.) and blends of nitrile rubber and PVC (e.g., Vynite™ from Dexter). EA's may comprise dynamically vulcanized elastomers (EPDM, nitrile, natural, and butyl rubber) in the presence of a thermoplastic matrix, for example, Santoprene™ from Advanced Elastomer Systems, L.P. (See M. T. Payne, and C. P. Rader, *"Thermoplastic Elastomers: A Rising Star"* in ELASTOMER TECHNOLOGY HANDBOOK, N. P. Cheremisinoff, ed. CRC Press, Boca Raton, Fla. (1993).

Examples of thermoset elastomers include, but are not limited to, Silastic™ silicone elastomers from Dow Corning, Viton™ fluoroelastomers from Du Pont, and Buna rubbers from American Gasket and Rubber Co. Ethylene copolymers include, but are not limited to, the resins Engage™ from Dow Corning and Flexomer™ from Union Carbide. Non-limiting examples of EVA copolymers include, but are not limited to, the resins Ultrathene™ from Quantum and ELVAX™ from Du Pont.

Non-limiting examples of a suitable polyurethane polymer include PC-16, available from BJB Industries, Tustin, Calif. and F-132 hard polyurethane polymer from Axson, Inc., Eaton Rapids, Mich.

D. Coating Material

The substrate of the present invention may comprise at least one coating material that is stably affixed to the first surface of the first layer. The thickness of the coating material may be substantially uniform. In one embodiment, the coating material is covalently bonded to a textured surface of the first layer, and alternatively is affixed by means of plasma deposition. The coating material may impart to the first layer at least one physical property that is representative of mammalian skin, and the choice of coating material(s) will depend upon the desired physical property. When more than one coating material is used, the compounds may be homogeneously mixed and/or may form discrete areas. In one embodiment, a first discrete coating material is stably affixed to the first surface of the first layer, and at least one additional coating material is stably affixed to the first coating material. The additional coating materials may be made from the same or from different coating materials than the first coating material. The thickness of the coating material may vary, but when the underlying first layer is textured, the coating material may be sufficiently thin so as not to mask or significantly interfere with an underlying texture, and may faithfully mimic the underlying substrate topography. In one embodiment, the thickness of an individual coating material is a monolayer. Alternatively, the thickness of an individual coating material is from about 0.1 nm to about 1 mm, and alternatively from about 1 nm to 0.1 mm.

Examples of classes of suitable coating materials, as well as properties representative of mammalian skin, are described in U.S. patent application Ser. No. 11/502,858. Suitable coating materials include, but are not limited to, chemical functional groups, organic compounds, hydrocarbons, chemically functionalized hydrocarbons, macrocycles, lipids, proteins, hydrophilic monomers, hydrophobic monomers, polymerizable monomers, metals, particulates, and combinations thereof. Additionally or alternatively, the coating material may comprise particulate materials and/or fibrous materials. In one embodiment, the coating materials are hydrocarbons, for example pentenes, hexenes and combinations thereof; chemically functionalized hydrocarbons, for example allyl amines, allyl alcohols, and mixtures thereof; chemically functionalized hydrocarbons modified with at least two distinct functional groups; hydrophilic monomers; hydrophobic monomers, for example perfluoromethylcyclohexane (PFMCH) monomer; polymerizable monomers, sulfides, and combinations thereof. In one embodiment, the coating material is selected from the group consisting of allyl amine, allyl alcohol, 1,1,1-trimethyl-1-pentene, perfluoromethylcyclohexane, and mixtures thereof.

E. Texture

The first layer and/or coating material may be textured. The texture comprises a plurality of impressions and/or elevated areas that may be patterned and/or may be randomly arranged. The impressions may be in the form of, for example, lines or grooves, the depth of which may vary depending upon the type and condition of skin upon which the substrate is modeled. In one embodiment, the impressions have a depth of from about 0.001 mm to about 10 mm, alternatively from about 0.001 mm to about 0.1 mm, alternatively from about 0.1 mm to about 1 mm, and alternatively from about 0.1 mm to about 0.5 mm, as measured from the average height of the planar surface of the first layer. The texture may be visible without the use of visual aids, (i.e., on a macroscopic level), or may be clearly visible only with visual aids such as a magnifying glass or microscope set at a 10× or 100× magnification setting. In one embodiment, the texture mimics the topography of mammalian skin. Alternatively, the texture mimics the topography of human skin. Alternatively, natural or artificial hair may be attached or anchored in the substrate such that one end protrudes outwardly through the coating material. Alternatively, the texture mimics a composite of topographies of skin from a plurality of individuals, representative of an average skin type of a given population.

The topography of the texture may vary to resemble degrees of wrinkling of skin. Alternatively, the depth of the impressions may vary to resemble skin ranging from relatively smooth (for example, oral mucosal linings) to deeply lined (for example, elbows or deep facial lines), and further may resemble scaly, fissured, rough, and/or otherwise visibly-textured skin. The texture may resemble the topography of skin on essentially any body part. The texture may resemble the topography of healthy skin or alternatively skin damaged by, for example, exposure to UV-rays, chemicals, and/or illness. Alternatively, a substrate may comprise discrete areas having different textures.

When the coating material forms a textured surface, the texture may result from structures in the coating material itself, non-limiting examples of which include particulates and fibers, or alternatively may result from impressions made in the coating material subsequent to deposition, for example, by "stamping."

II. Physical Properties Representative of Keratinous Tissue

The substrate demonstrates one or more physical properties that are representative of mammalian keratinous tissue, described in U.S. patent application Ser. No. 11/502,858. The property or properties of interest will vary according to factors that include, but are not limited to, the type of keratinous tissue, the environment of the keratinous tissue, the individual consumer, the substance that is being applied to the keratinous tissue and/or the product with which the keratinous tissue comes into contact. Examples of representative properties include, but are not limited to, surface energy (for example, hydrophobicity and hydrophilicity), surface charge, surface reactivity, texture, appearance, form, and combinations thereof. The properties can be controllably varied by, for example, the choice of substrate layer materials, thickness of the layers, and/or coating layer materials, and by varying parameters that control deposition of the coating layer.

The coating layer may have an average surface charge that is representative of mammalian keratinous tissue. Herein, the surface charge of the coating layer is understood to mean the average surface charge of a representative area of coating layer, although localized variations may occur due to such factors as variation of deposition of coating materials (e.g., proteins and lipids) and texture. The surface charge of the coating layer may be positive, negative, or neutral, and is largely determined by the presence of ionic species, including acidic and basic species. The surface charge determines, for example, the polarity of the keratinous tissue, which in turn may affect deposition and adhesion of various substances on the surface. The net surface charge may be measured by determination of the isoelectric point and/or the zeta-potential of the surface. A variety of means of determining the zeta-potential may be employed and would be known to one of skill in the art. For the purposes of the present invention, determine the zeta-potential of the coated substrates by streaming potential measurements conducted on an Electro Kinetic analyzer (Model No. BI-EKA, Anton Parr GmbH, Brookhaven Instruments Corporation, New York, N.Y.) with a clamp cell configuration, using as an electrolyte solution $1.0 \times 10^{-3}$ M KCl in deionized water, titrated starting from a pH of about 2.5 to a pH of about 8.0 using a 1N solution of NaOH. The zeta potential values generated as a function of pH are relative to standard PMMA (polymethyl methacrylate). Each zeta-potential profile (for each type of coated substrate and other model) can thus be compared in relative terms.

In one embodiment, the zeta-potential of the coating layer at a pH of about 5.0 is from about $-30$ mV to about $+30$ mV, where "mV" means $1 \times 10^{-3}$ Volts. In one embodiment, the zeta-potential of the coating layer at a pH of about 5.0 is from about $-15$ mV to about $+15$ mV.

The coating layer may have an average surface energy that is representative of mammalian keratinous tissue. Herein, the surface energy of the coating layer is understood to mean the average surface energy of a representative area of coating layer, although localized variations may occur due to such factors as variation of deposition of coating materials (e.g., proteins and lipids) and texture. The surface energy of the coating layer correlates to hydrophobicity and hydrophilicity, and may be representative of, for example, the moisture content of skin. The surface energy of the coating layer are derived from contact angle measurements, which can be converted to surface energy by various accepted models that would be known to one of skill in the art. One such model, used in the present invention, is the Fowkes equation, as described in Fowkes, F. M.: *Industrial and Engineering Chemistry*, vol. 56, number 12, p. 40 (1964):

$$\gamma_{lv}(1+\cos\theta) = 2(\gamma_{lv}^{d}\gamma_{sv}^{d})^{1/2} + 2(\gamma_{lv}^{p}\gamma_{sv}^{p})^{1/2}$$

where $\theta$ refers to the contact angle; $\gamma_{lv}$ refers to the surface tension of the liquid; $\gamma_{lv}^{d}$ refers to the dispersive component of the surface tension of the liquid; $\gamma_{sv}^{d}$ refers to the dispersive component of the surface tension of the solid; $\gamma_{lv}^{p}$ refers to the polar component of the surface tension of the liquid and $\gamma_{lv}^{p}$ refers to the polar component of the surface tension of the solid. The contact angles of the coated substrates of the present invention were measured using diiodomethane (99%, Aldrich), ethylene glycol (99%+, Aldrich) and water (HPLC grade, Aldrich).

The total surface energy of the coating layer is the sum of the dispersive surface energy component and the polar surface energy component, which is thought to affect properties such as adhesion of substances to the coating layer. In one embodiment, the coating layer has a total surface energy of from about 15 mJ/m² to about 50 mJ/m², alternatively from about 20 mJ/m² to about 40 mJ/m² and alternatively from about 28 mJ/m² to about 35 mJ/m², where "mJ" means $1 \times 10^{-3}$ Joules and "m²" means square meters. In one embodiment, the coating layer has a polar surface energy component of from about 0 mJ/m² to about 15 mJ/m². Alternatively, the polar surface energy component is from about 0 mJ/m² to about 5 mJ/m², alternatively from about 7 mJ/m² to about 13 mJ/m², and alternatively from about 13 mJ/m² to about 20 mJ/m².

The coating layer may have a surface reactivity that is representative of mammalian keratinous tissue. Surface reactivity is understood to include an increased tendency to react with, or alternatively to bond to, a given compound. Surface reactivity may be determined by a variety of methods, including, for example, measurement of binding coefficients. In contrast to surface charge, which relates to the presence of ionic species, surface reactivity is understood to encompass other types of chemical interactions, for example, covalent interactions. One non-limiting example of surface reactivity would be that exhibited by a thiol-containing coating material toward nucleophilic chemical moieties, for example gold or silver, in products and/or substances.

III. Method of Use

The present invention describes methods of use of the substrate described herein, comprising the step of applying one or more substances to the surface of the substrate to form a substance-coated surface. The methods of use may include a method of modeling the interaction of a substance with mammalian skin, a method of product evaluation, wherein a substance is applied to the substrate and/or wherein the substrate is used in instrumentation capable of measuring frictional force. The methods of use further may include modeling the deposition and/or adhesion of a substance onto mammalian keratinous tissue; and the cleansing, or removal, of a substance from keratinous tissue.

The substance may be applied directly to the substrate, for example with one's hand or with an implement, or may be applied by transfer from an article of manufacture or second substrate. Alternatively, the substance may be applied and an article of manufacture subsequently brought into contact with the substrate, for example, to measure the absorbancy of the article of manufacture. Non-limiting examples of suitable articles of manufacture include absorbent products, such as facial tissue, facial cleansing pads, toilet tissue, paper towels, catamenial pads, and tampons; baby care products, including diapers, wipes, cleansers, conditioners; adult incontinence products; and combinations thereof.

The method further may comprise the step of performing one or more analyses of the substrate, the article of manufacture, and/or the substance of interest. The substance may be removed from the substrate, for example by rinsing, wiping, or other suitable means, prior to, during and/or after analysis. In one embodiment, the steps of applying a substance, performing analysis, and optionally removing the substance, may be repeated at least once, alternatively at least five times, alternatively at least ten times, and alternatively at least twenty times.

The substance may be a product, for example a consumer product, a natural substance, and/or an imitation of a natural substance. The consumer product may be marketed, intended to be marketed, or have the potential to be marketed to consumers. Examples of products include, but are not limited to, skin care products, including moisturizers, cleansers and combinations thereof; perfumes and perfume raw materials, whether alone or as part of a composition; cosmetics; pharmaceutical products and/or compositions comprising pharmaceutical ingredients; neutraceuticals, for example vitamins, minerals, herbal products and other plant extracts and/or compositions comprising neutraceuticals; hair care products, including shampoos, conditioners, styling agents, bleaches, colorants, and combinations thereof; deodorants; antiperspirants; perfumes; deodorizers; fabric care products, including softeners, detergents, cleansers, whiteners and deodorizers; household cleansing products, such as dish detergents, surface cleaners, disinfectants, soaps, etc; and combinations of any of the foregoing. Examples of natural substances include, but are not limited to, water, bodily fluids such as blood, menstrual fluid, urine and breast milk; bodily waste, such as feces and mucosal secretions; plant products, for example, grass stains, pollen and other allergens; and combinations of these and/or any of the aforementioned products. Alternatively, the substance may be an imitation of any of the aforementioned natural substances, which has properties similar to those of interest in the natural product. Alternatively, the substance may be one that may stain under given circumstances, non-limiting examples of which include ink, wax crayons, dyes and colorants, etc.

A wide variety of amounts of substance may be applied to the article of manufacture, and will depend upon such factors as the substance and the intended use thereof. In one embodiment, the amount of substance applied is the amount of a particular substance that a consumer is instructed to topically apply, or alternatively, the amount of a substance that a consumer would reasonably be expected to topically apply. Alternatively, the amount of substance applied represents an amount that would be expected to occur as a result of bodily functions, or of physical activities, for example, sweat resulting from physical activity or stains in clothing resulting from playing outdoors. In one embodiment, the amount applied to the article of manufacture is from about 0.1 $mg/cm^2$ to about 1.0 $g/cm^2$, alternatively from about 0.5 $mg/cm^2$ to about 0.5 $g/cm^2$ and alternatively from about 1 $mg/cm^2$ to about 0.1 $g/cm^2$.

The methods of the present invention may be performed under static conditions or with dynamic movement, at room temperature, or at body temperature. Alternatively, the substrate may be pre-conditioned to specified environmental conditions, for example, temperature, humidity, UV-radiation, light, exposure to additional substances, etc. In one embodiment, the methods of use described herein comprise the step of heating the substrate to a temperature of from about 35° C. to about 45° C., and alternatively to about 37° C. Alternatively, the substance may be applied with the aid of an energy delivery device, such as an ultrasonic, ultraviolet, or heat energy delivery system. Alternatively, the substances may be applied with a delivery enhancement device, non-limiting examples of which include an implement, such as a sponge or sponge-tipped applicator, a spray applicator, a brush, and combinations thereof.

In one embodiment, a method product evaluation is provided comprising the step of using a substrate described herein in an instrument capable of measuring frictional force, non-limiting examples of which include tensiometers, such as a Texture Analyzer Plus™, a tribometer, and/or Instron™ instruments. The frictional force in turn may be correlated to the tactile perception, or "feel," of a product, for example, running one's fingers through washed and/or conditioned hair, stroking a washed dish, feeling one's skin after applying a moisturizer; the feel of the mouth, gums, lips, etc. after use of an oral hygiene product, tackiness, softness, glide, slipperiness, oiliness or greasiness, "squeaky clean" feel, etc. A variety of suitable instruments is commercially available or may be assembled, and would be known to one of skill in the art. A suitable substrate (first substrate) may be secured to the instrument, and used as a sensing element. The substrate may be textured or untextured, and may comprise a coating layer or be uncoated. In one embodiment, a substance may be applied to the substrate to produce a substance-coated first substrate. A substance may be applied to a second substrate, non-limiting examples of which include a substrate as described herein, a sample of artificial skin, a sample of artificial hair, mammalian fur and/or human hair; household goods such as dishes, fabrics; substances representative of household surfaces, etc., to produce a substance-coated second substrate. The first substrate and substance-coated second substrate may be placed in direct contact and moved in a controlled fashion relative to each other. In one embodiment, the movement is repeated. In one embodiment, the movement simulates conditions of actual use. The coefficient of friction is measured as the substrate and substance-coated second substrate are moved. Optionally, a solvent, for example water or a cleansing solution, may be allowed to flow or otherwise contact the substrate prior to and/or during analysis.

In one embodiment, the interaction that is modeled is deposition of a substance onto mammalian skin. A substance may be applied to the substrate, and the retention of the substance or a component thereof on the substrate may be assessed. Retention also is understood to include the uniformity of deposition, for example, the uniformity of the thickness of an applied substance, or of the concentration of a given substance per unit of area. Retention also may be assessed by monitoring the release of a substance after deposition, for example, the release over time of a perfume raw material. Alternatively, the substance not deposited onto the substrate (for example, the substance retained on an applicator) may be analyzed. In one embodiment, the applied substance is at least partially removed from the substrate prior to analysis of the substance and/or substrate. Removal may occur, for example, by rinsing with water or other solvents, wiping, and/or blotting with a second article of manufacture, evaporation, etc. Alternatively, the remaining substance may be eluted or otherwise removed from the substrate using appropriate chemical means, and optionally the amount of substance in the eluent determined. Alternatively, a method is provided for determining the effectiveness of electrospray deposition of substances. For example, a substance may be applied to a substrate as described herein by means of electrospray deposition, and suitable analyses performed as described herein.

In one embodiment, the interaction that is modeled is cleansing, or removal, of a substance from mammalian skin. One non-limiting example of a method for evaluating the cleansing capability of a product includes the steps of applying a first substance to a substrate having properties of keratinous tissue of interest to form a substance-coated substrate; applying a second substance, for example, a cleansing composition, to the substrate by rinsing, wiping, dipping, rubbing, or other suitable means; and analyzing the substrate to assess or to quantify the amount and/or type of substances remaining on the substrate. Alternatively, the second substance may be applied to a wipe, for example, a non-woven wipe, to form a wipe product. Alternatively, the second substance may be applied by means of a delivery enhancement device. Alternatively, the method may comprise the step of applying energy to the substance-coated substrate. In one embodiment, the first substance is a cosmetic and/or skin care composition. Alternatively, the first substance is a natural or imitation substance such as sebum, dirt or other impurity. Alternatively, the first substance is a chromophore, an ink, or a similar substance that may produce a permanent or semi-permanent marking. In one embodiment, the second substance is water, a solvent, a personal care composition such as a skin cleansing composition, facial cleansing composition, exfoliating composition, mask, etc., and combinations thereof.

In one embodiment, the interaction that is modeled is adhesion of a substance and/or an adhesive article of manufacture onto the substrate. Examples of adhesive articles of manufacture include, but not limited to, bandages, temperature change devices, heat delivery systems, transdermal delivery devices, patches for delivery of skin care actives, masks (for example, facial masks comprising a skin care active), and combinations thereof. The device may adhere to the keratinous tissue and/or substrate by means of an adhesive layer, or may have no discrete adhesive layer. One non-limiting example of a method for evaluating adhesion includes the steps of applying an adhesive article of manufacture to a substrate having properties of keratinous tissue of interest (for example, surface energy, surface charge, texture, and/or shape of a body part) to form a substrate-adhesive complex; optionally exposing the substrate-adhesive complex to, for example rinsing, cleansing, or environmental conditions; optionally subjecting the substrate with the adhered article of manufacture to movement, such as bending and/or twisting; and performing at least one analysis of the substrate-adhesive complex. Alternatively, the adhered article of manufacture may be removed by mechanical means, and the force required for removal measured. Alternatively, the underlying substrate may be analyzed after removal, for example, to assess the presence of adhesive residue, transfer of actives, changes in the substrate, etc.

Alternatively, a method of consumer product evaluation is provided, comprising the steps of applying a substance to a surface of an artificial substrate to form a substance-coated surface, generating a first set of data by performing at least one analysis of the substance-coated surface, and comparing the data to a second set of data. The second set of data may be obtained, for example, after applying a substance to an artificial substrate described herein or elsewhere, by analyzing mammalian skin, and/or may comprise consumer preferences. Optionally, after comparing the data, the substance may be modified to produce a more desirable comparison, and the steps of the method of product evaluation repeated at least once.

Alternatively, the substrate may be used as a calibration standard for instrumental measurements. The substrate, or alternatively a series of substantially similar substrates may be made having a desired property, for example texture, form or appearance, as described herein. The substrate(s) may include a series of markings having a measured dimension. The measured dimensions may vary incrementally. Examples of suitable markings include, but are not limited to, lines having a measured depth and/or length to represent wrinkles; indentations having a measured diameter and/or depth, representing pores; discrete areas of color having measured size, absorbance and/or refraction, to represent pigmentation and overall skin tone. The standards may be analyzed by a suitable instrument to produce a calibration curve, which may be used to quantify the same characteristic on, for example, mammalian keratinous tissue.

Other properties of products that may be modeled by applying a substance to a substrate as described herein include, but are not limited to, glide; greasiness; stickiness; smoothness; stability of a product and/or substance; changes in physical properties such as color, opacity, odor and texture; and combinations of any of the foregoing.

IV. Article of Commerce

The present invention provides for an article of commerce, or alternatively for a kit, comprising an article of manufacture as described herein, and a communication describing the use of said article of manufacture to evaluate the interaction of at least one substance with said article of manufacture. The communication may be printed material attached directly or indirectly to packaging that contains the article of manufacture. Alternatively, the communication may be placed directly or indirectly near a container. Alternatively, the communication may be an electronic or a broadcast message that is associated with the article of manufacture. Alternatively, the communication may describe at least one possible use, capability, distinguishing feature and/or limitation of the article of manufacture.

In one non-limiting example of an article of commerce of the present invention, an article of manufacture comprising a substrate as described herein is packaged together with a sheet of printed instructions. The substrate material may have a surface texture resembling mammalian keratinous tissue, for example, skin or hair. The instructions communicate, among other things, the intended use of the substrate, how to properly apply a substance to the substrate, and how to clean the substrate prior to re-use.

In another non-limiting example of an article of commerce of the present invention, a package contains an article of manufacture comprising a substrate as described herein. A printed advertisement, for example, in a trade journal, refers to the article of manufacture contained in the package and communicates that the substrate and coating material are suitable for testing consumer products.

EXAMPLES

Example 1 describes one process for making an example of a substrate as described herein that mimics the properties of skin on a human forearm.

Make a first negative imprint of keratinous tissue by applying a material[1] capable of forming a cast, or mold, onto a human forearm. (To make imprints of other keratinous tissue, a negative imprint similarly may be made of another body part, for example, human skin on other parts of the body, lips, hair, etc.). When set, remove the cast and allow to dry for 3-7 min. Create a positive mold that resembles the body part in both form and texture by placing, for example, silicone or other suitable material[2] in the negative mold. Remove the material from the negative mold to obtain the positive mold, and impress the positive mold into polyurethane or other suitable material to create a second negative mold. Remove the positive mold and allow the second negative mold to cure overnight. Optionally, the positive mold may be pressed into a unitary mold of polyurethane or other suitable material to create multiple negative molds. Optionally, two or more second negative molds may be attached to each other to create a larger mold area, for example, multiple molds of lips. Alternatively, a negative mold containing the skin-texture can be made into a variety of shapes, for example a square shape of 10×10 cm.

[1] Suitable materials include PLY-O-LIFE™ and ALGIFORM™ casting material, both available from Pink House Studios (St. Albans, Vt.); or other suitable equivalent materials.

[2] Other suitable materials include dental materials, liquid rubber, room temperature vulcanized (RTV) rubber, plastic, or equivalents thereof.

To form the first layer, spray coat the second negative mold with a 1:1 mixture of Skin-Flex SC-89[3] stretch paint (aliphatic polyurethane gloss paint) and Skin-Flex SC-89 thinner[4] to create a layer having a thickness of from about 100 μm to about 600 μm, and allow to dry for at least 12 hours.

[3] SC-89 Stretch Paint, available from Burman Industries (Van Nuys, Calif.).
[4] SC-89 Thinner, available from Burman Industries, (Van Nuys, Calif.).

To form the second layer, pour an amount of a suitable second material having a hardness of from about 45 to about 60 on the Shore OOO scale for the second layer, for example XP-574[5], sufficient to create a layer having a thickness of from about 0.01 cm to about 1 cm onto the dried first layer. Prior to pouring, degas the liquid polymers sufficiently to remove undesirable trapped air bubbles. Allow to cure/dry for about 24 hours.

[5] XP-574, BJB Industries (Tustin, Calif.)

To form the third layer, pour an amount of a suitable degassed material, for example, PC-16[6], onto the second layer. The amount should be sufficient to create a layer having a thickness of from about 0.1 cm to about 1 cm, onto the dried second layer. Allow to cure/dry for about 24 hours.

[6] PC-16, available from BJB Industries (Tustin, Calif.). Other suitable materials include PC-15, XP-573, TC-410 polyurethane, Part A (aromatic diisocyanate based pre-polymer, plasticizer mixture) and Part B, polyurethane curing agent, for example, polyether polyol, di(2-ethylhexyl) adipate, aromatic amines, aryl mercuric carboxylate) with Parts A and B in a 1:1 ratio. Optionally, Part C (Plasticizer-ester) may be included at a level of 1% to 150% by weight of the combination of Parts A and B. An acceptable alternative to TC-410 parts A and B is Skin Flex, Part A (aromatic diisocyanate terminated polyoxypropylene glycol mixture); Part B, polyurethane curing agent (polyol-diamine mixture), with Part A and Part B in a 1:2 ratio; and optionally Skin Flex Part C (Plasticizer-ester) at a level of 1% to 150% by weight of the combination of Parts A and B; all available from BJB Industries (Tustin, Calif.).

Allow the resulting multi-layered substrate to cure for at least an additional 24 hours before gently removing from the second negative mold. The surface of the substrate may be modified by using atmospheric plasma treatments and/or other suitable chemical treatments. The substrates may be used to simulate a number of body parts, for example human wet skin, young skin, aged and/or damaged skin, the forehead, shinbone, and/or cheek area.

The following table provides examples of substrates made according to the above procedure, where the first layer has an average thickness of about 100 micrometers to about 600 micrometers, the second layer comprises XP-574, and wherein the first negative imprint uses a human forearm to produce a texture on the first surface of the first layer similar to a human forearm.

| Sample | Thickness of Layer 3 (cm) | Thickness of Layer 2 (cm) | Coefficient of Friction[1] | Hardness (Shore OOO)[1] | Suitable to mimic area of human skin |
|---|---|---|---|---|---|
| 1 | 0.25 | 0.75 | 0.44 | 4 | [2] |
| 2 | 0.50 | 0.50 | 0.39 | 9 | [2] |
| 3 | 0.65 | 0.35 | 0.50 | 30 | [2] |
| 4 | 0.75 | 0.25 | 0.53 | 26 | [2] |
| 5 | 0.85 | 0.15 | 0.68 | 46 | [3,4] |
| 6 | 0.85 | 0.12 | 0.43 | 48 | [3,4] |
| 7 | 0.85 | 0.09 | 0.63 | 56 | |
| 8 | 0.85 | 0.06 | 0.89 | 60 | |
| 9 | 0.85 | 0.03 | 0.66 | 60 | |
| 10 | 0.85 | 0.15 | 0.30 | 52 | [5] |

[1] Average of three measurements.
[2] Samples 1, 2, 3, and 4 represent comparative examples that fail to provide an adequate simulation of the elasticity of human skin.
[3] Volar forearm
[4] Calf
[5] Upper Lip.

Example 2

The following example describes a substrate suitable to mimic the skin on top of hard tissue, for example, of a thin layer of skin overlaying bone, for example, of the human shin or forehead.

Make the substrate as described in Example 1, wherein the first layer has an average thickness of about 100 micrometers to about 600 micrometers, the second layer comprises XP-574, the third layer has a hardness of from about 70 to about 80 on the Shore D scale, and the hardness of the substrate is about 52 to about 55 on the Shore OO scale. The second layer may have a thickness of about 0.15 cm, and the third layer a thickness of about 0.85 cm. One example of a suitable material for the third layer is F-132 hard polyurethane polymer from Rudolph Bros. and Co., Canal Winchester, Ohio 43110.

Example 3

The following example describes a substrate suitable to mimic wet skin.

Make the substrate as described in Example 1, wherein the first layer has a thickness of about 1 micrometer or less, the second layer comprises XP-574, the third layer comprises PC-16, the second layer has a thickness of about 0.15 cm, and the third layer a thickness of about 0.85 cm. The resulting substrate will have a coefficient of friction similar to wet skin.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A substrate that mimics mammalian skin comprising:
   a) a discrete first layer that resembles an outermost layer of skin and includes a first surface, an opposing second surface and a polymeric first material comprising polyurethane polymer, wherein the first layer has a thickness of from 1 micron to 1000 microns and a hardness of from about 10 to about 80 on the Shore A scale;
   b) a discrete second layer comprising a first surface, an opposing second surface, and a second material comprising silicone gel, wherein the second layer has a hardness of from about 1 to about 70 on the Shore OOO scale and a thickness of from 0.001 cm to 2.0 cm;
   c) a discrete third layer comprising a first surface and a third material comprising polyurethane polymer, wherein the third layer has a hardness of from about 0 to about 90 on the Shore D scale; and wherein the second surface of the first layer is in substantially fixed and continuous contact with the first surface of the second layer; the second surface of the second layer is in substantially fixed and continuous contact with the first surface of the third layer; and wherein the ratio of the average thickness of the second layer to the average thickness of the third layer is from 4:96 to 25:75; and
   d) at least one coating material that is stably affixed to the first surface of said first layer, wherein said coating material imparts to the first layer at least one physical property that is representative of mammalian skin.

2. The substrate of claim 1, wherein the first surface of the first layer has a total surface energy of from about 15 $mJ/m^2$ to about 50 $mJ/m^2$, a zeta-potential at a pH of about 5.0 of from about −30 mV to about 30 mV, a polar component of the total surface energy of from about 0 $mJ/m^2$ to about 15 $mJ/m^2$, and combinations thereof.

3. The substrate of claim 1, wherein the first surface of the first layer is textured.

4. The substrate of claim 3, wherein the textured first surface mimics mammalian skin.

5. The substrate of claim 1, wherein said second layer has a thickness of from about 0.01 cm to about 0.5 cm.

6. The substrate of claim 1, wherein said third layer has a hardness of from about 40 to about 90 on the Shore 00 scale.

7. The substrate of claim 1, wherein the coefficient of friction of the substrate is from about 0.3 to about 1.0.

8. The substrate of claim 1, wherein the first layer extends around the entire substrate to form a protective sheath.

9. The substrate of claim 1, wherein the coating material demonstrates at least one physical property representative of mammalian skin, selected from the group consisting of a total surface energy of from about 15 $mJ/m^2$ to about 50 $mJ/m^2$, a zeta-potential at a pH of about 5.0 of from about −30 mV to about 30 mV, a polar component of the total surface energy of from about 0 $mJ/m^2$ to about 15 $mJ/m^2$, and combinations thereof.

10. The substrate of claim 1, wherein said coating material is selected from the group consisting of linear hydrocarbons, branched hydrocarbons, cyclic hydrocarbons, aromatic hydrocarbons, alkanes, alkenes, amines, amides, alcohols, sulfides, particulates, and mixtures thereof.

11. The substrate of claim 1, wherein said coating material is textured.

12. The substrate of claim 1, wherein the ratio of the thickness of the second layer to the third layer is from about 4:96 to about 15:85.

13. The substrate of claim 1, wherein the sum of the thickness of the second layer and the thickness of the third layer is from about 1 mm to about 2 cm.

14. The substrate of claim 1, wherein the sum of the thickness of the second layer and the thickness of the third layer is from about 0.5 cm to about 2 cm.

15. An article of commerce comprising:
   a) a substrate comprising:
      i. a discrete first layer that resembles an outermost layer of skin comprising a first surface, an opposing second surface and a first material comprising polyurethane polymer, wherein the first layer has a thickness of from about 1 micron to about 1000 microns and a hardness of from about 10 to about 80 on the Shore A scale;
      ii. a discrete second layer comprising a first surface, an opposing second surface, and a second material comprising silicone gel, wherein the second layer has a hardness of from about 1 to about 70 on the Shore OOO scale and a thickness of from about 0.001 cm to about 2.0 cm;
      iii. a discrete third layer comprising a first surface and a third material comprising polyurethane polymer, wherein the third layer has a hardness of from about 0 to about 90 on the Shore D scale; and wherein the second surface of the first layer is in substantially fixed and continuous contact with the first surface of the second layer; the second surface of the second layer is in substantially fixed and continuous contact with the first surface of the third layer; and wherein the ratio of the average thickness of the second layer to the average thickness of the third layer is from about 4:96 to about 25:75; and
      iv. at least one coating material that is stably affixed to the first surface of said first layer, wherein said coating material imparts to the first layer at least one physical property that is representative of mammalian skin; and
   b) a communication to use said article of commerce to simulate mammalian skin.

* * * * *